April 11, 1967   C. J. ATKINSON ETAL   3,313,176
MECHANICAL LOCKING ARRANGEMENTS
Filed Nov. 27, 1964

3,313,176
MECHANICAL LOCKING ARRANGEMENTS
Cyril John Atkinson and Eric William Jacobs, Kidsgrove, Stoke-on-Trent, England, assignors to English Electric-Leo Computers Limited, London, England, a British company.
Filed Nov. 27, 1964, Ser. No. 414,067
Claims priority application Great Britain, Nov. 29, 1963, 47,316/63
8 Claims. (Cl. 74—531)

The invention relates to mechanisms arranged to be driven from rotatable shafts having non-circular cross-sections. The invention may, for example, be embodied in a tractor assembly driven by a splined shaft and being arranged to feed paper through data printing apparatus.

According to the invention, a mechanism arranged to be driven from a rotatable shaft having a non-circular cross-section includes two members each defining a through hole shaped to engage drivingly with the shaft, and first means operative in use to tend to produce a relative angular displacement between the two members about the axis of the shaft so as to tend to reduce backlash between the shaft and the members.

Preferably, the mechanism includes second means operative to remove the said angular displacement between the two said members, the first means being operative to lock the two members to the shaft so as to prevent longitudinal movement of the members along the axis of the shaft and the second means being operative to unlock the members from the shaft so as to permit such longitudinal movement.

Advantageously, the first means comprises spring means for tending to move the said two members apart along the axis of the shaft, and cam means for producing from the movement apart of the two members the said angular displacement, and the second means comprises means for moving the two members together along the axis of the shaft against the action of the spring means.

Preferably, the two said members are respectively provided with first and second tubular extensions, the internal diameter of the first extension being greater than the external diameter of the second extension and the second extension projecting into the first extension, and the cam means comprises a pin projecting substantially radially from the wall of one of the extensions and engaging with a slot cut in the wall of the other extension, the shape of the slot producing the said angular displacement of the two members when the two members move apart.

In an embodiment of the invention, the shaft is externally splined and the through holes of the two members are internally splined.

The mechanism may include means driven by rotation of at least one of the members for feeding material on which data can be printed through a data printing machine.

A tractor assembly for feeding paper through a data printer and embodying the invention will now be described by way of example and with reference to the accompanying drawings in which.

Figure 1:
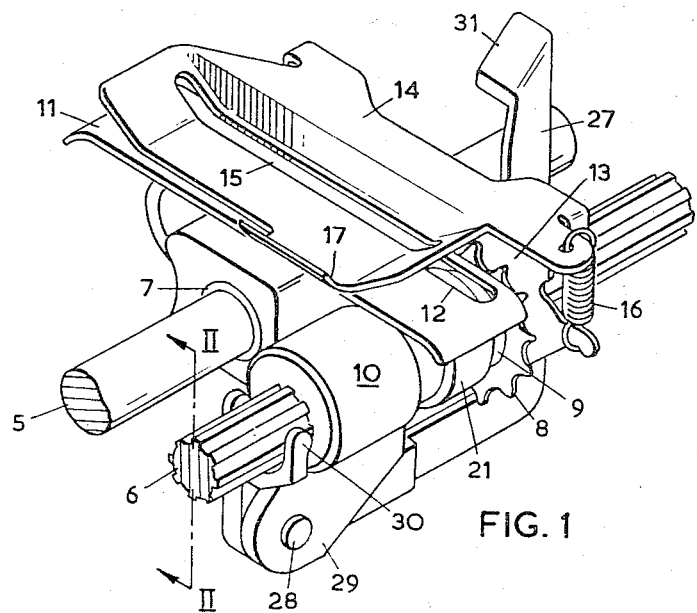
FIG. 1 is a perspective view of the tractor assembly.

The tractor assembly is mounted on two shafts supported in the printer, a plain stationary shaft 5 and a splined rotatable shaft 6. The shaft 5 passes through bearings 7 in the tractor assembly. The shaft 6 engages with splines in the central hole of a toothed sprocket 8 having an extended body portion 9, so that rotation of the shaft 6 rotates the sprocket 8. The shaft 6 also engages with splines in, and rotates, a cam follower member 10 whose operative relationship with the sprocket 8 will be explained below.

The tractor assembly has a paper platform 11 mounted on it, having a slot 12. Also mounted on the tractor assembly is a vertical back-plate 13 to which is hinged an upper plate 14 having a slot 15 aligned, when the plate 14 is in the position illustrated in FIG. 1, with the slot 12 in the paper platform 11. An over-centre tension spring 16 connected between the plate 13 and the plate 14 holds the latter plate either in the position shown or, when the plate has been lifted by a lip 17, in a vertical position. A second sprocket (not shown), aligned with the sprocket 8, is rotatably mounted on the tractor assembly adjacent to the ends of the slots 12 and 15 opposite to the ends nearest to the sprocket 8. An endless chain (not shown in FIG. 1) operatively connects the two sprockets. Each link 18 (FIG. 2) of the chain carries an extension arm 19 on the distal end of which is mounted a projection 20. The arms 19 are so shaped as to position the projections 20 so that they protrude through the slot 12 and are aligned with the top of the slot 15.

Figure 2:
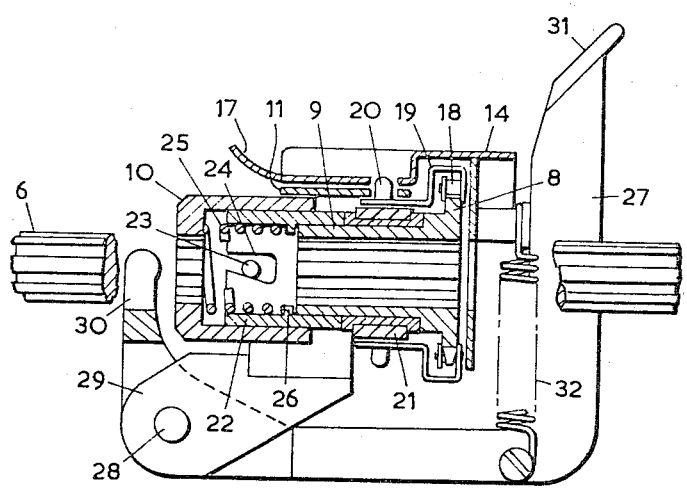
FIG. 2 is a section on the line II—II of FIG. 1 showing part of the mechanism in more detail.

The mechanism will now be described with particular reference to FIG. 2. The body portion 9 of the sprocket 8 is rotatably mounted in a bearing 21 in the body of the tractor assembly. A cam member 22 of tubular form, having an internal diameter such as to be an interference fit on the external surface of the body portion 9 of the sprocket, is pressed on to the body portion and rotates therewith. The cam follower 10 is a sliding fit on the cam member 22.

The cam follower 10 carries a pin 23 fixed to its internal surface and projecting inwardly. This pin engages with a slot 24, shaped as shown, cut in the tubular wall of the cam member 22. A compression spring 25, which with one end engages the cam follower 10 and with the other end engages a ridge 26 formed on the internal surface of the cam member 22, acts so as to tend to force the cam member 22 and the cam follower 10 apart. Any such movement, however, causes the pin 23 to slide along the edge of the slot 24: the inclination of the edge of the slot is such that the cam follower and cam member tend to rotate in opposite directions relative to one another about the axis of the shaft 6. The cam member 22 carries with it the body portion 9 of the sprocket by virtue of its interference fit therewith. The opposite rotation of the cam follower 10 and the body portion 9 is resisted by the splines on the shaft 6 and thus each shaft spline is subjected to side forces applied respectively to its opposite sides by the splines of the cam follower 10 and the body portion 9. These side forces frictionally lock the body portion 9 to the shaft 6 preventing movement of the body portion 9, and the whole tractor assembly, along the shaft 6, and also eliminating clearance between the splines on the shaft 6 and the mating splines in the sprocket 8 and the member 10.

A handle 27, which is pivoted by means of a pin 28 passing through an extension 29 on the body of the tractor assembly and which has a forked end 30, is provided for releasing the mechanism descrcibed. When finger pressure is applied to an end 31 of the handle 27, the forked end 30 pushes the cam follower 10 towards the cam member 22 compressing the spring 25 and pushing the pin 23 towards the closed end of the slot 24. The closed end of the slot is wider than the open end, and the pin, when at the closed end of the slot, therefore has a greater degree of freedom of movement, thus freeing the splines of the shaft 6 from the side forces mentioned above. The tractor assembly can therefore be slid along shafts 5 and 6 without difficulty. A tension spring 32 normally holds the forked end 30 away from the end of the cam follower 10.

In use, two similar tractor assemblies are mounted on the shafts 5 and 6 which are arranged at right angles to the direction of flow of paper through the printer. The paper has holes along each edge and the tractor assemblies are so positioned on the shafts, after releasing the mechanism by means of the handle 27, that the holes in the paper engage with the projections 20 on the links of the chain carried by the sprocket 8, the paper being positioned between the platform 11 and the plate 14. When the shaft 6 is rotated by means, for example, of an electric motor, the sprocket 8 drives the chain causing the paper to be fed through the printer. The mechanism described enables the relative positions of the tractor assemblies on the shafts 5 and 6 to be easily adjusted to suit different paper widths. As stated it also eliminates any clearance between the splines on the shaft 6 and the mating splines in the sprocket 8 and the cam follower member 10 thus avoiding backlash and reducing wear on the splines when they are subjected to high accelerating or braking forces.

A bracket (not shown) may be attached to the body of the tractor assembly in such a position that, when the end 31 of the handle 27 is moved by an operator to release the mechanism, the bracket may simultaneously be grasped by the operator with the same hand thus enabling the operator to release the tractor assembly from the shaft 6, and to move it along the shaft, with one hand.

What we claim as our invention and desire to secure by Letters Patent is:

1. A mechanism arranged to be driven from a rotatable shaft having a non-circular cross-section, including two members each defining a through hole shaped and engaged drivingly with the shaft, and torque producing means operative in use to produce a relative angular displacement between the two members about the axis of the shaft so as to reduce backlash between the shaft and the members.

2. A mechanism according to claim 1, including torque reducing means operative to remove the said angular displacement between the two said members, the torque producing means being operative to lock the two members to the shaft so as to prevent longitudinal movement of the members along the axis of the shaft and the torque reducing means being operative to unlock the members from the shaft so as to permit such longitudinal movement.

3. A mechanism according to claim 2, in which the torque producing means comprises spring means for tending to move the said two members apart along the axis of the shaft, and cam means for producing from the movement apart of the two members the said angular displacement, and the torque reducing means comprises means for moving the two members together along the axis of the shaft against the action of the spring means.

4. A mechanism according to claim 3, in which the two said members are respectively provided with first and second tubular extensions, the internal diameter of the first extension being greater than the external diameter of the second extension and the second extension projecting into the first extension, and the cam means comprises a pin projecting substantially radially from the wall of one of the extensions and engaging with a slot cut in the wall of the other extension, the shape of the slot producing the said angular displacement of the two members when the two members move apart.

5. A mechanism according to claim 1, in which the shaft is externally splined and the through holes of the two members are internally splined.

6. A mechanism according to claim 1, including means driven by rotation of at least one of the members for feeding material on which data can be printed through a data printing machine.

7. A mechanism arranged to be driven from a rotatable shaft having a non-circular cross-section, including two members each defining a through hole shaped and engaged drivingly with the shaft, first means operative in use to produce a relative angular torque between the two members about the axis of the shaft so as to cause the two members to grip the shaft and thereby reduce backlash between the shaft and the members, and second means comprising lever means operable to move the two members towards each other, the two members being provided with cam means co-operatively effective to reduce said angular torque in response to the movement of the two members towards each other, thereby releasing the members for sliding along the shaft.

8. A mechanism according to claim 7, including means driven by rotation of at least one of the members for feeding material on which data can be printed through a data printing machine.

No references cited.

MILTON KAUFMAN, *Primary Examiner.*